(12) United States Patent
Gotesdyner et al.

(10) Patent No.: US 8,769,349 B2
(45) Date of Patent: Jul. 1, 2014

(54) MANAGING NETWORK DEVICES BASED ON PREDICTIONS OF EVENTS

(75) Inventors: Rony Gotesdyner, Sunnyvale, CA (US); Mark Shurtleff, Oakland, CA (US); Ali Ebtekar, Palo Alto, CA (US); Barry Bruins, Los Altos, CA (US)

(73) Assignee: Cisco Technology, Inc., San Jose, CA (US)

( * ) Notice: Subject to any disclaimer, the term of this patent is extended or adjusted under 35 U.S.C. 154(b) by 264 days.

(21) Appl. No.: 13/274,926

(22) Filed: Oct. 17, 2011

(65) Prior Publication Data

US 2012/0192016 A1 Jul. 26, 2012

Related U.S. Application Data

(60) Provisional application No. 61/436,601, filed on Jan. 26, 2011.

(51) Int. Cl.
*G06F 11/00* (2006.01)

(52) U.S. Cl.
USPC .......................................... 714/47.3

(58) Field of Classification Search
USPC .......................................... 714/47.3
See application file for complete search history.

(56) References Cited

U.S. PATENT DOCUMENTS

| | | | |
|---|---|---|---|
| 4,634,110 A | | 1/1987 | Julich et al. |
| 6,993,686 B1 * | | 1/2006 | Groenendaal et al. ....... 714/47.2 |
| 7,143,153 B1 * | | 11/2006 | Black et al. .................... 709/223 |
| 7,249,170 B2 | | 7/2007 | Tindal et al. |
| 7,299,276 B1 * | | 11/2007 | Strawn ........................... 709/224 |
| 7,721,157 B2 * | | 5/2010 | Spitz et al. .................... 714/47.2 |
| 8,041,786 B2 | | 10/2011 | Tindal et al. |
| 8,156,207 B2 | | 4/2012 | Wood et al. |
| 8,316,113 B2 | | 11/2012 | Linden et al. |
| 8,320,388 B2 | | 11/2012 | Louati et al. |
| 2004/0139184 A1 * | | 7/2004 | Bantz et al. .................... 709/223 |
| 2005/0049832 A1 * | | 3/2005 | Gorinevsky ................... 702/182 |
| 2005/0198279 A1 * | | 9/2005 | Flocken et al. ............... 709/224 |
| 2008/0282104 A1 * | | 11/2008 | Khan .................................. 714/2 |
| 2010/0159898 A1 | | 6/2010 | Krzyzanowski et al. |
| 2010/0162036 A1 | | 6/2010 | Linden et al. |
| 2010/0275263 A1 * | | 10/2010 | Bennett et al. ................... 726/25 |
| 2010/0299419 A1 | | 11/2010 | Ramankutty et al. |
| 2010/0318487 A1 * | | 12/2010 | Marvasti ......................... 706/47 |
| 2011/0061051 A1 * | | 3/2011 | Haber et al. ................... 718/100 |

(Continued)

OTHER PUBLICATIONS

U.S. Appl. No. 13/278,121, filed Oct. 20, 2011, Office Action, Aug. 1, 2013.

(Continued)

*Primary Examiner* — Bryce Bonzo
(74) *Attorney, Agent, or Firm* — Hickman Palermo Truong Becker Bingham Wong LLP

(57) ABSTRACT

In an embodiment, a data processing method comprises: a computer obtaining occurrence data representing one or more performance measurements collected for a network device and associated with one or more data metrics; monitoring the occurrence data; determining one or more current trends that are reflected in the occurrence data; determining one or more predicted trends for the network device; determining, based on the predicted trends, one or more future events that are predicted to occur at the network device at a future time; determining, by applying a site policy to the one or more future events, one or more preventive actions for the network device to prevent occurrence of the one or more of the future events.

21 Claims, 8 Drawing Sheets

(56) References Cited

U.S. PATENT DOCUMENTS

| | | |
|---|---|---|
| 2011/0066898 A1* | 3/2011 | McRory et al. ............... 714/47.3 |
| 2011/0126111 A1 | 5/2011 | Gill et al. |
| 2011/0208567 A9* | 8/2011 | Roddy et al. ................. 705/7.41 |
| 2012/0191826 A1 | 7/2012 | Gotesdyner |
| 2012/0192075 A1 | 7/2012 | Ebtekar |

OTHER PUBLICATIONS

U.S. Appl. No. 13/178,386, filed Jul. 7, 2011, Final Office Action, Jun. 14, 2013.

U.S. Appl. No. 13/178,386, filed Jul. 7, 2011, Office Action, Jan. 31, 2013.

* cited by examiner

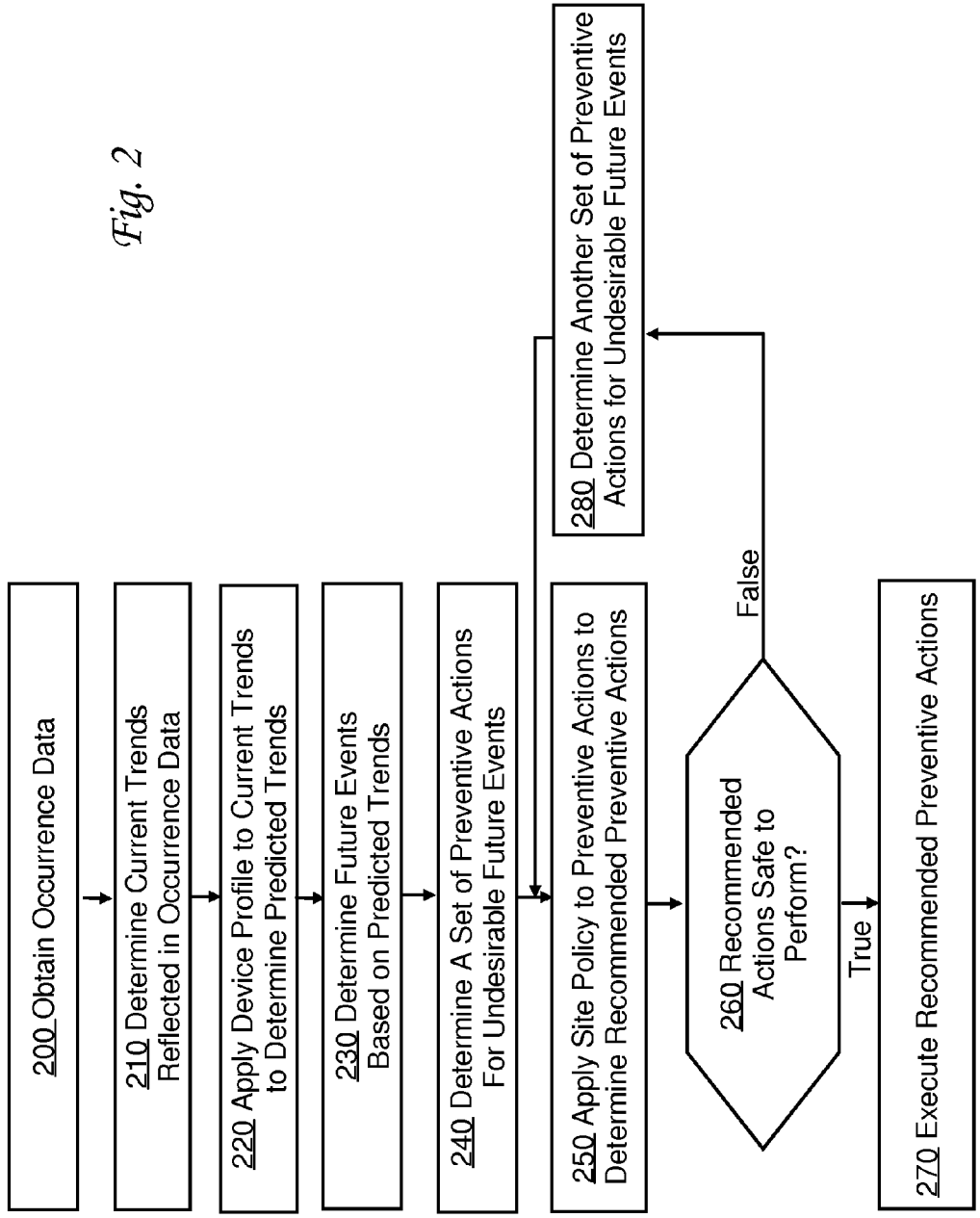

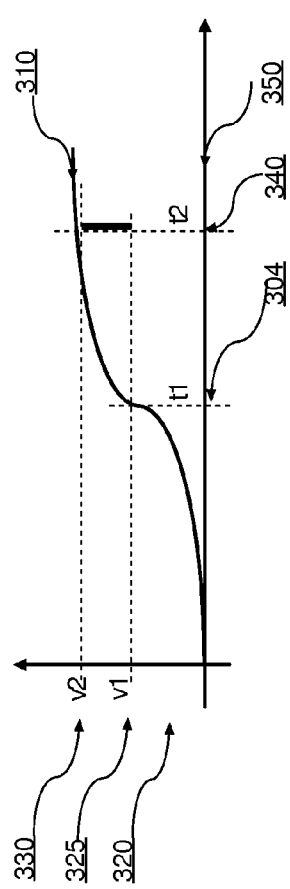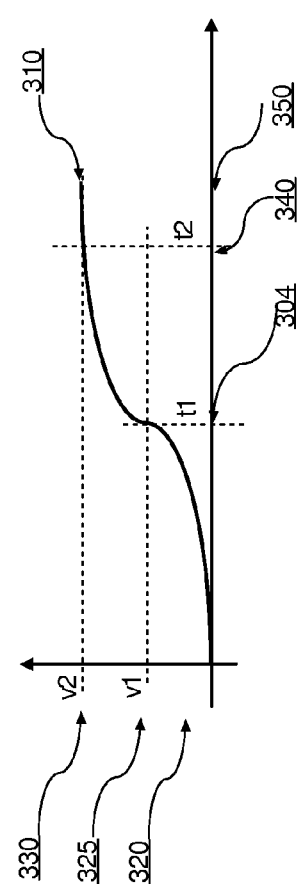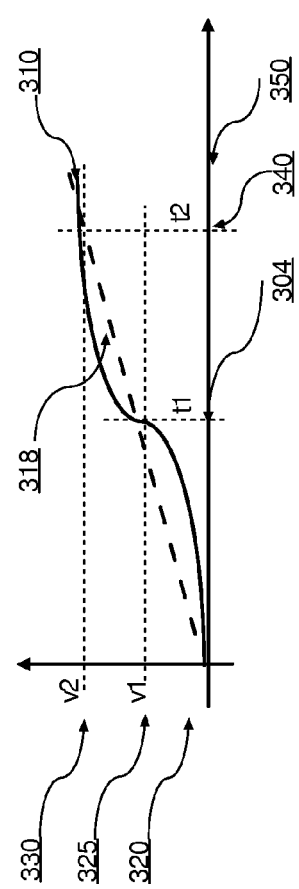

MANAGING NETWORK DEVICES BASED ON PREDICTIONS OF EVENTS

BENEFIT CLAIM; CROSS-REFERENCE TO RELATED APPLICATIONS

This application claims the benefit under 35 U.S.C. 119(e) of provisional application 61/436,601, filed Jan. 26, 2011, the entire contents of which are incorporated by this reference for all purposes as if fully set forth herein.

This application is related to U.S. patent application Ser. No. 13/178,386, filed Jul. 7, 2011, entitled Device-Health-Based Dynamic Configuration Of Network Management System Suited For Network Operations, by inventors Rony Gotesdyner and Barry Bruins.

This application is related to U.S. patent application Ser. No. 13/278,121, filed Oct. 20, 2011, entitled Integrated View Of Current, Recent And Historic Network Management Data Objects, by inventors Ali Ebtekar, David Digirolamo, Dustin Beltramo, Mark Shurtleff and Rony Gotesdyner.

TECHNICAL FIELD

The present disclosure is generally related to data communications between devices in a distributed network infrastructure, and specifically relates to determining potential problems in network devices and reconfiguring the devices to avoid an actual occurrence of the potential problems in the future.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Network performance monitoring applications may collect network communications information, process the communications information and display the processed information in various forms, including charts, panels and other displays. Typical monitoring focuses on past and present states of the network and provides characteristics of the network devices based on historical and current performance data.

Conventional monitoring applications trace past and present performance of network devices and communications links, and display various characteristics of the past and present configuration and utilization for the network. While such monitoring may be useful in detecting problems that have already occurred in the network, such monitoring rarely provides enough information for predicting network problems that may occur in the future.

BRIEF DESCRIPTION OF THE DRAWINGS

In the drawings:

FIG. 2 illustrates an embodiment of determining a preventive action for a network device;

FIG. 3A illustrates an embodiment of an absolute-value-change trend;

FIG. 3B illustrates an embodiment of a relative-change trend;

FIG. 3C illustrates an embodiment of trending-values trend;

DESCRIPTION OF EXAMPLE EMBODIMENTS

Figure 1:
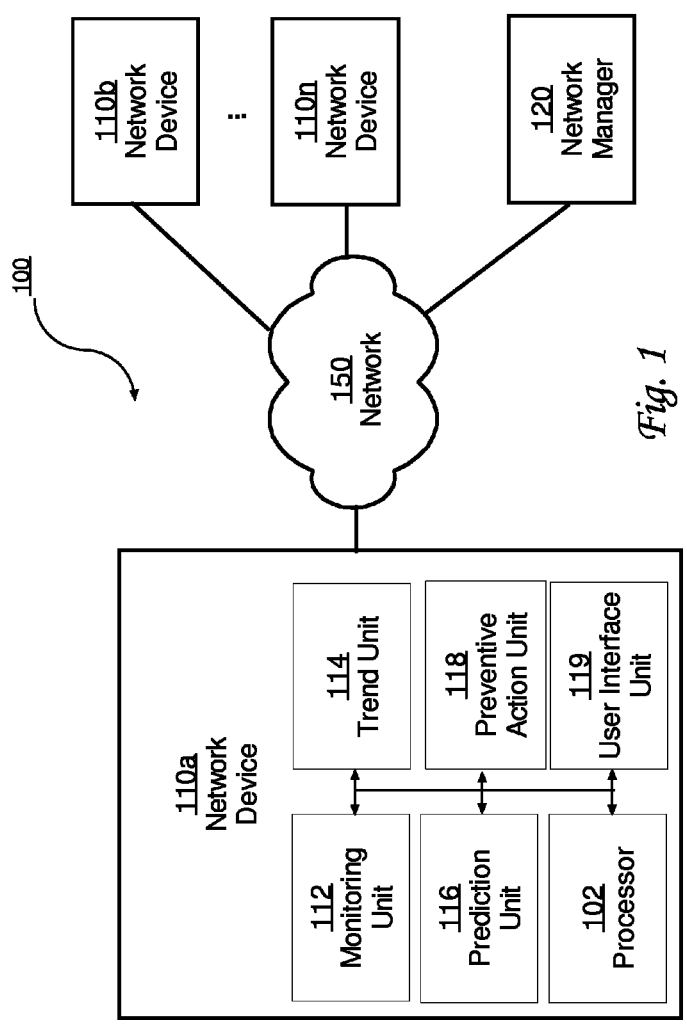
FIG. 1 illustrates an embodiment of a network device configured to determine preventive actions.

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 Overview
2.0 Structural and Functional Overview
3.0 Determining a Preventive Action for a Network Device
4.0 Trends
5.0 Graphical User Interface Example
6.0 Implementation Mechanisms—Hardware Overview
7.0 Extensions and Alternatives 1.0 Overview In an embodiment, an approach is presented for automatically determining one or more preventive actions which, once executed, prevent occurrence of one or more undesirable future events. A computer implemented data processing method comprises: monitoring occurrence data, the occurrence data representing one or more performance measurements collected for a network device and being associated with one or more data metrics; determining one or more current trends that are reflected in the occurrence data; determining one or more predicted trends for the network device; determining, based on the predicted trends, one or more future events that are predicted to occur at the network device at a future time; determining, by applying a site policy to the one or more future events, one or more preventive actions for the network device to prevent occurrence of the one or more of the future events.

In an embodiment, the method further comprises causing execution of a particular preventive action at the network device in response to obtaining approval to perform the particular preventive action from the one or more preventive actions; determining whether the execution of the particular preventive action prevents occurrence of the particular future event; updating a device profile associated with the network device based on the occurrence data; and based on the occurrence data, updating the one or more data metrics.

In an embodiment, the monitoring the occurrence data comprises at least one of: monitoring service levels for applications executed on the network device; monitoring infrastructure of the network device to ensure delivery of communications to and from the network device; monitoring capacity issues of the network device; monitoring usage of the network device; monitoring changes in traffic patterns; monitoring configuration issues; and monitoring violations of a service level objective.

In an embodiment, the device profile comprises: the site policy; a function description of one or more functions that the network device is configured to perform; a role description of one or more roles that the network device is configured to perform; a resource description of a storage capacity and a processing capacity of the network device; a configuration description of configuration parameters and settings for the network device; and one or more data histograms generated from the occurrence data obtained for the network device.

In an embodiment, the site policy comprises: one or more rules to determine deviations from a service level agreement (SLA) for the network device; rules to determine whether the one or more current trends exceed one or more threshold values; rules to determine whether an absolute value in a first trend from the one or more trends exceeds a first threshold value; rules to determine whether a relative trend change in a second trend from the one or more trends exceeds a second threshold value; rules to determine whether trend values in a third trend from the one or more trends are consistent with historical data.

In an embodiment, the preventive actions to be executed on the network device comprise at least one of: modifying the device profile to collect additional performance data; activating one or more additional data metrics to store the additional performance data for the network device; obtaining additional information about a status of the network device; monitoring the one or more additional data metrics to determine any potential problems in carrying on functions of the network device; opening a service call to service the network device; opening a device reconfiguration request to reconfigure the network device; generating an alarm to indicate a specific problem with the network device; issuing a notification to indicate the specific problem with the network device; indicating one or more applications that should not be executed on the network device; indicating one or more components of the network device that require servicing.

In an embodiment, the method further comprises displaying, on a display device, a graphical user interface that depicts the one or more data histograms in one or more display panels; in response to receiving first user input selecting a first indicator from a first display panel, determining a first request for displaying a first data histogram, and displaying the first data histogram in a histogram panel; in response to receiving second user input selecting a second indicator from a second display panel, determining a second request for displaying the one or more current trends, the one or more predicted trends, and the one or more preventive actions, displaying the one or more current trends, the one or more predicted trends in trend panels, and displaying the one or more preventive actions in an action panel; in response to receiving third user input selecting a third indicator from the action panel, requesting activation of the particular preventing action from the one or more preventive actions displayed in the action panel.

In an embodiment, an internetworking device comprises one or more processors, monitoring unit, a trend unit, a prediction unit, a preventing action unit and a user interface unit that are configured respectively to perform processes described herein.

In an embodiment, a non-transitory computer-readable storage medium stores one or more sequences of instructions which, when executed by one or more processors, cause the one or more processors to perform the processes described herein.

2.0 Structural and Functional Overview

In an embodiment, a system or process monitors past and current events at various components of a network and obtains past and current characteristics of the network application patterns. Furthermore, the system applies to the collected and monitored information various policies and profiles to determine possible or likely future events that may occur at the network components in the future. Trend analysis including identification of performance trends may be performed using the monitored events. Based on the future events, policies and profiles, the system predicts future problems in the network and determines one or more preventive actions which, once executed on the network components, may prevent the occurrence of the predicted events in the future.

FIG. 1 illustrates an example embodiment of a network device 110a configured to determine preventive actions which, once executed on network device 110a, prevent occurrence of one or more events in the future. In an embodiment, network 100 is a packet-switched data network comprising a plurality of nodes, and the nodes comprise routers, switches, firewalls, gateways or other infrastructure elements; in some embodiments, the nodes may comprise computers or other endpoints.

In an embodiment, data communications network 100 comprises one or more network devices 110a through 110n, one or more sub-networks 150, and a network manager device 120. Network devices 110a through 110n, and network manager device 120 can be any type of a workstation, laptop, PDA device, phone, etc.

For purposes of illustrating clear examples, FIG. 1 shows network devices 110a, 110b, and 110n, one network manager device 120, and one sub-network 150. However, practical embodiments may use any number of network devices 110, network manager devices 120 and sub-networks 150.

In an embodiment, a sub-network 150 is communicatively coupled to network devices 110a through 110n, and network manager device 120. Sub-network 150 is used to maintain various communications sessions and may implement one or more communications protocols.

Network device 110a through 110n, and network manager device 120 may implement the processes described herein using hardware logic such as in an application-specific integrated circuit (ASIC), field-programmable gate array (FPGA), system-on-a-chip (SoC) or other combinations of hardware, firmware and/or software.

In an embodiment, network devices 110a through 110n, network manager device 120 and sub-network 150 comprise hardware or software logic configured to generate and maintain various types of communications session information, and routing information for data communications network 100.

In an embodiment, network device 110a comprises a processor 102, a monitoring unit 112, a trend unit 114, a prediction unit 116, a preventive action unit 118 and a user interface unit 119.

For purposes of illustrating clear examples, FIG. 1 shows that network device 110a comprises one processor 102, one monitoring unit 112, one trend unit 114, one prediction unit 116, one preventive action unit 118 and one user interface unit 119. However, in practical embodiments, each of network devices 110a through 110n may comprise one or more processors 102, one or more monitoring units 112, one or more trend units 114, one or more prediction units 116, one or more preventive action units 118 and one or more user interface units 119.

In an embodiment, a processor 102 facilitates communications to and from network device 110a, processes commands received by and executed by network device 110a, processes responses received by network device 110a, and facilitates various types of operations executed by network device 110a. Processor 102 comprises hardware and software logic configured to execute various processes on network device 110a.

In an embodiment, a monitoring unit 112 is configured to collect various types of information about network device 110a, components of network device 110a, and communications sessions involving network device 110a. Some types of the information may be collected online as the components of network device 110a execute their functions. Other types of information may be collected by sending probes and requests to individual components of network device 110a. Other types of information may be collected by dedicated monitoring units (not depicted in FIG. 1) that store the collected information in storage resources that are available to network device 110a.

In an embodiment, a monitoring unit 112 is configured to collect device events reported by one or more network devices 110a, and indicated in outputs generated by system applications, such as syslog, SNMP Trap, SNMP and MIB. Monitoring unit 112 can also collect traffic flow information from output generated by applications such as netflow and sflow. Furthermore, monitoring unit 112 can collect packet based information, internal communications exchanged by various application modules, and external communications exchanged with performance agents. Moreover, monitoring unit 112 can collect information provided by the end-user device, such as a phone.

In an embodiment, extraction of performance events can be performed by a probe application executed on network devices or external to the network devices.

In an embodiment, monitoring unit 112 is configured to collect and/or retrieve occurrence data for network device 110a. The occurrence data may represent various types of information collected for components of network device 110a. For example, the occurrence data may represent performance measurements collected for network device 110a, such as measurements of various characteristics of the components of network device 110a. That may include for instance information about a configuration of network device 110a, functions and roles of network device 110a, CPU utilization, memory utilization, alarms and warnings, volume of data traffic transmitted via network device 110a, a quantity and types of applications executed on network device 110a, a quantity and types of active session on network device 110a, an average data transmission time, and any other information characterizing network device 110a.

In an embodiment, occurrence data represents performance measurements collected not only for network device 110a, but also for other network devices, such as devices 110b through 110n, and 120 that communicate with network device 110a. For example, the occurrence data may include configuration information for each network device 110a through 110n, network manager 120, and configuration information of network 100 as a whole. The occurrence data may also include the network/device CPU utilization, memory utilization, alarms and warnings, traffic information, network application information, active sessions, types of sessions, average network application response times, and any other information characterizing network devices 110a through 110n and network 100 as a whole.

In an embodiment, monitoring unit 112 is configured to monitor service levels for applications executed on network device 110a, and infrastructure of network device 110a utilized to ensure a delivery of communications to and from network device 110a at a specified service level. For example, monitoring unit 112 may monitor bandwidth characteristics of links established with network device 110a, usage of resources available to network device 110a, changes in traffic patterns, configuration issues, and violations of the service level objective.

In an embodiment, based on collected information, monitoring unit 112 may determine whether network device 110a has sufficient resources to effectively handle a current workload. For example, monitoring unit 112 may determine whether network device 110a has sufficient processing resources available to perform one or more operations scheduled to be performed on network device 110a. Examples of the processing resources may include current CPU resources, memory resources, bandwidth, and other resources that the operations executed on network device 110a may require.

In an embodiment, trend unit 114 is configured to determine one or more current trends for network device 110a through 110n, or network 100 as a whole. A current trend may be determined based on any information available to trend unit 114. For example, a trend may be determined based on obtained occurrence data, device characteristics, end-user device patterns, site profiles, characteristics, historical data collected for network devices 110a through 110n, or network 100 considered as a whole, and any other information about components of network 100.

In an embodiment, a site profile comprises information about a hardware and software configuration of a network site. A site may be a group of network devices communicatively coupled with each other and other networks. A site may also be a computer network communicatively coupled with one or more other networks. Moreover, a site may be a single network device operating in a standalone mode or communicatively coupled to other network devices and/or networks. Furthermore, a site may be a set of deployed customer networks that are serviced by one or more service providers. A site profile may comprise information about hardware/software configuration of the respective individual network devices, groups of devices or networks of networks.

In an embodiment, a site profile may have an associated type. For example, a relative small site may have a mini-type site profile. A network of retail stores may have a retail-type site profile. A network of retail stores that implement for example, a VPN-type communications and a WAAS-type communications may have a retail-heavy-type site profile. A complex network of distribution centers may have a distribution-center-type profile.

Examples of various site profile type may be explained with reference to a coffee shop host. For example, a hypothetical coffee shop enterprise may have multiple types of sites. Each type may be determined based on the site size and typical customer traffic. A mini type is a site that may be hosted in a supermarket. It offers rather limited services and is configured to launch a limited number and types of applications. A retail type may be a standard shop. It may offer multiple user connectivity, collaborations, and other multi-user services. A retail-heavy-traffic type is a site that is configured to service high volume customer traffic. It may provide VPN services and WAAS services. Finally, a distribution-center type may be a hub for provisioning coffee, paper cups, cakes etc., and for supporting execution of variety applications.

In an embodiment, a particular type of the site profile may be modified and/or adjusted. A modification of the type of the site profile may be closely monitored to avoid compatibility problems between the types and the sites. For example, before a particular type of the site profile is modified to a new type, the system may check whether the devices associated with the particular site profile would have the capabilities to provide various functions and services that are typical for the network devices that are associated with the new type.

In an embodiment, a trend unit 114 is configured to process occurrence data obtained by monitoring unit 112, and to determine one or more current trends that are reflected in the occurrence data. For example, based on the occurrence data, trend unit 114 may determine one or more behavioral characteristics of network devices 110a through 110n, or the network as a whole. For example, based on the collected and available data, trend unit 114 may determine one or more current behavioral trends for any of network devices 110a through 110n, or network 100 as a whole.

In an embodiment, trend unit 114 is configured to determine one or more current trends that are specific to network device 110a. For instance, trend unit 114 may determine that, based on the occurrence data related to an average response time for data packets sent from and to network device 110a, the average response time for data packets communicated between network device 110a and network device 110b has been consistently increasing during late-morning-hours since the beginning of the last month.

In an embodiment, prediction unit 116 is configured to determine one or more predicted trends for network device 110a. For example, based on one or more current trends and various profiles and policies, prediction unit 116 may determine one or more predicted trends that may persist in the future. For example, based on current, consistently increasing trends in an average response time for data packets communicated between network device 110a and network device 110b, prediction unit 116 may determine that if the current trend for the average response time continues to increase in the future, the average response time for data packets could soon exceed a predefined threshold, indicating an unacceptable response latency for network device 110a. Hence, prediction unit 116 may determine that one of the predicted trends may indicate a consistent increase in the average response time that soon could exceed an acceptable predefined threshold, indicating problems with response latency for network device 110a.

In an embodiment, prediction unit 116 is also configured to determine, based on the predicted trends, one or more future events that are predicted to occur at network device 110a in a future time. For example, prediction unit 116 can determine that a predicted trend with regard to an average response time for data packets transmitted via network device 110a will most likely indicate that an acceptable, predefined threshold value will be exceeded in the near future. If so, prediction unit 116 may determine that, assuming that the predicted trend will persist, a response latency will become unacceptable in the near feature. For instance, the response latency may cause stalling packets' transmission via network device 110a in the near future, causing network device 110a to most likely fail.

In an embodiment, preventive action unit 118 is configured to determine one or more preventive actions for network device 110a to prevent occurrence of one or more undesirable future events.

In an embodiment, determination of the one or more preventive actions may be achieved by applying a policy of network device 110a, policy of network 100 or any other information available to preventive action unit 118 to current and future trends. For example, preventive action unit 118 may retrieve information about a current configuration of network device 110a, information about available hardware upgrades to the current components of network device 110a, network profile indicating types of hardware upgrades that can be acceptably performed on network device 110a, and any other information that could provide any indication of possible preventive actions which, once executed on network device 110a, could prevent occurrence of the predicted, undesirable future events.

In an embodiment, preventive actions for a particular device may include issuing a request to change a policy for the device, a request to turn on instrumentation for a particular metric, a request to determine interdependency between one or more future events, a request to open a call to a network technician to service a particular network devices, a request to contact a network management to discuss the problem, a request o reconfigure one or more network devices, a request to enable or disable certain services, a request to enable or disable certain applications, a notification about the problem to customers and user, or any other action that potentially may prevent occurrence of one or more undesirable future events.

In an embodiment, a preventive action unit 118 is configured to receive information about one or more predicted future events and to apply various policies to the received information to determine one or more recommended preventive actions for network device 110a to prevent occurrence of the one or more predicted future events. For example, a device policy may provide that one of the approaches for lowering packet-response-latency includes determining whether an Input/Output (I/O) board on network device 110a may be upgraded, and if so, determining whether an upgraded I/O board is available or needs to be ordered and provisioned.

In an embodiment, a user interface unit 119 is configured to cause a graphical user interface on a display communicatively coupled to network device 110a to be displayed. The graphical user interface may comprise various panels. The panels may be used to display performance measurements data collected for network device 110a, recommended operation for instrumentation or reconfiguration of network device 110a, and any other information useful to a user of network device 110a.

In an embodiment, user interface unit 119 is configured to display a graphical user interface that comprises one or more indicators indicating whether network device 110a has sufficient processing resources available to perform one or more operations scheduled to be performed on network device 110a.

In an embodiment, a graphical user interface may comprise a panel that indicates the current CPU resources, memory resources, bandwidth, and information about other resources that the operations executed on network device 110a may require. Examples of various panels of the graphical user interface are described in reference to FIG. 8.

Although FIG. 1 depicts an embodiment in which monitoring unit 112, trend unit 114, prediction unit 116, preventive action unit 118 and user interface unit 119 are configured on network device 110a, the respective units may also be configured on any of network devices 110a through 110n, as well as on network manager 120.

In an embodiment (not depicted in FIG. 1), network manager 120 comprises a processor 102, a monitoring unit 112, a trend unit 114, a prediction unit 116, a preventive action unit 118 and a user interface unit 119. Functionalities of processor 102, monitoring unit 112, trend unit 114, prediction unit 116, preventive action unit 118 and user interface unit 119 configured on network manager 120 are the same as the functionalities of the respective units configured on network device 110a as described above, with the exception that the respective functions are executed by the units of network manager 120, not the units of network device 110a. Furthermore, processor 102, monitoring unit 112, trend unit 114, prediction unit 116, preventive action unit 118 and user interface unit 119 configured on network manager 120 obtain occurrence data for any of network devices 110a through 110n, determine current and predicted trends for any network devices 110a through 110n, determine predicted, future events for any network devices 110*a* through 110*n*, and determine preventive actions to prevent occurrence of the future events for any network devices 110*a* through 110*n*.

3.0 Determining a Preventive Action for a Network Device

FIG. 2 illustrates a flow chart of an example method for determining a preventive action for a network device 110*a*. For purposes of illustrating clear examples of FIG. 2, the references are made to network device 110*a*, the operations depicted in FIG. 2 are performed by units that are configured on network device 110*a*, and the execution of the operations depicted in FIG. 2 affects network device 110*a*. However, in practical embodiments, the operations depicted in FIG. 2 may be performed by units configured on any device 110*a* through 110*n*, 120, and the execution of the operations depicted in FIG. 2 may affect any network device 110*a*, 110*b*, . . . 100*n*, 120, and even the network 100 as a whole.

In an embodiment, an approach for predicting one or more future events to occur at a network device in a future time and determining one or more preventive actions for the network device to prevent occurrence of the undesirable future events is presented.

In an embodiment, the approach incorporates a concept of a new type of predictive trending. In contrast to a conventional approach for a network monitoring, which captures past and present characteristics of the network, the presented approach allows predicting one or more future characteristics of the network devices, predicting events that may occur at the network devices in the feature, and determining actions which, when executed on the network device, may prevent occurrence of the undesirable future events.

At block 200, in an embodiment, occurrence data are obtained and monitored. The occurrence data may represent one or more performance measurements collected for a network device over time and associated with one or more data metrics. The occurrence data may be collected by various data collection applications. The occurrence data may be stored on data servers, and made available to network devices and a network manager in any acceptable form.

In an embodiment, occurrence data comprises any type of monitored data, including monitored service levels for applications executed on a network device, monitored infrastructure of the network device to ensure delivery of communications to and from the network device, monitored capacity issues persistent on the network device, monitored usage of the network device, monitored changes in traffic patterns, monitored configuration issues, monitored violations of a service level objective, and other data about the network device.

At block 210, one or more current trends that are reflected in obtained occurrence data are determined. A current trend may be described as a general tendency, inclination or general direction in which some characteristics tend to move. For example, if one type of performance measurements pertains to measurements of an average response time collected for data packets transmitted via a network device over a specified period of time, and if an absolute value of the average response time for the data packets has been consistently increasing, then a current trend for the average response time has a general tendency to increase over time.

In an embodiment, one or more current trends, reflected in occurrence of a particular type of data, are determined using various approaches. For example, a current trend may be determined by taking into account absolute values of the particular data sampled at predetermined time intervals. According to another example, a current trend may be determined by taking into account absolute value changes of the particular data sampled at predetermined time intervals. According to another example, a current trend may be determined by taking into account relative change increase values of the particular data sampled at predetermined time intervals. According to yet another example, a current trend may be determined by taking into account overall tendency of the particular data sampled at predetermined time intervals. More information about determining one or more current trends reflected in the occurrence data is provided in FIG. 3A-3C, described below.

At block 220, one or more predicted trends for network device are determined. In an embodiment, the predicted trends are determined by applying a network device profile to the current trends determined at block 210. For example, a prediction process can use the information included in the network device profile to determine a proper configuration and performance instrumentation for the network device. That can include calculating and exporting one or more metrics for the network device and applying the metrics to the current trend information. Furthermore, the process can determine an additional configuration for the network device and determine whether any additional instrumentation is required for the network device. This allows leveraging the knowledge about active network services to derive more accurate predictions of potential outages.

In an embodiment, a predicted trend may be described as a general tendency in which a particular current trend might proceed in the future. For example, if a current trend for an average response time has a general tendency to increase, then, assuming that the current trend will be maintained in the future, the predicted trend may be determined as continuing to increase in the future. For example, if an average response time for data packets transmitted via a network device has been consistently increasing during the last few weeks, then using the current trend information and some additional information, such as the network device profile, it can be predicted that the tendency may persist and that the predicted trend for the average response time may continue to increase.

In an embodiment, a device profile for a network device comprises information about the device configuration, communications, characteristics, status and other data that can be used to describe the network device. For example, the device profile may comprise the network policy, a function description of one or more functions that the network device is configured to perform, and a role description of one or more roles that the network device is configured to perform. Furthermore, the device profile may comprise a resource description of a storage capacity and a processing capacity of the network device. Moreover, the device profile can comprise a configuration description of configuration parameters and settings for the network device, and one or more data histograms generated from the occurrence data obtained for the network device.

At block 230, one or more future events are determined based on predicted trends. A future event is an event that may occur at a network device at a future time, provided that one or more corresponding predicted trends are continued in the future time. For example, if it has been predicted that an average response time for data packets transmitted via the network device will continue to increase over time, then one of the future events may include stalling the network device or a failure of the network device because the network device may be unable to process the incoming data traffic.

At block 240, a set of preventive actions for undesirable future events is determined. The preventive actions may be determined based on one or more predicted future events that could occur in the future on a network device or a group of network devices. First, information about the one or more predicted future events is analyzed to determine whether the respective predicted future events are desirable or undesirable. In an embodiment, a potential future event is determined as undesirable if it is determined that occurrence of the potential future events in the future could negatively impact operations of components of the network.

If a potential future event is undesirable, then the system may try to determine one or more preventive actions, execution of which may prevent occurrence of the particular, undesirable future event.

A predicted future event may be prevented from occurring on a network device if the system determines one or more preventive actions which, once executed on the network device, may prevent occurrence of the predicted, undesirable event in the future. For example, if it is predicted that a network device could fail in the near future due to increased data traffic transmitted via the network device, then the system may try to determine whether there is at least one preventive action that could potentially avert a failure of the network device.

For instance, if it has been determined that an average response time for data packets transmitted via a network device might continue to increase in the near future, then the system may determine that to prevent the network device failure, a service level policy should be modified, or an I/O board of the network device should be upgraded, or a CPU modules of the processing board of the network device should be upgraded. Most likely, if the I/O board of the network device is upgraded and/or the CPU board of the network device is upgraded, then the network device might be able to process data packets transmitted via the network device faster, and hence, and the failure of the network device might be avoided.

In an embodiment, determining preventive actions may be useful in determining a strategy for preventing undesirable future events from occurring in the future. The strategy may be based on performing one or more preventive actions to prevent the future events from occurring in the first place. Because the predicted trends, future events and preventive actions are determined automatically, a network engineer does not have to necessary be familiar with logical connections between the predicted trends, future events and preventive actions, and does not have to be familiar with logical reasoning for explaining why a particular preventive actions may prevent occurrence of the particular future events. Consequently, the network engineer does not have to be trained in the area of such logical reasoning. This approach may provide substantial cost savings in terms of network engineers' training, and substantial time savings in terms of protecting the network a network down-time.

At block 250, a site policy is applied to one or more preventive actions to determine a one or more recommended preventive actions. In this step, the system determines whether execution of any of the one or more preventive actions will comply with a site policy. The action can be an incremental change to a site policy. It does not necessarily need to change the entire site policy.

Those of the one or more preventive actions that do comply with the site policy are selected as recommended preventive actions. However, those of the one or more preventive actions that do not comply with the site policy are not considered as the recommended preventive actions.

For example, if according to a site policy of a particular network device, upgrading an I/O board and a CPU board were examples of the preventive actions, but it is determined that an I/O board and a CPU board of the network device have been already upgraded, and no additional hardware and software upgrades are feasible for the particular network device, then, the particular preventive actions are not recommended preventive actions. Upgrading the I/O board and the CPU board on the particular network device does not seem to be a viable option at this time, and hence it may not be recommended for execution on the particular network device.

However, even if a particular preventive action is not a recommended preventive action for execution on a particular network device, there might be some other strategy for preventing the particular network device from failing. For example, a reduction of the data traffic communicated via the particular network device might be achieved by adding new routers and/or switches to the network, adding new communications links to the network, etc. Those actions may prevent the particular network device from failing; however those preventive actions would not be performed on the particular network device itself. Those preventive actions may be recommended to a network administrator, or may be sent in a form of a notification to a network manager module or other unit configured to control the hardware and software configuration of the network as a whole.

At block 260, it is determined whether each of the one or more recommended preventive actions is acceptable to perform in a network. For example, a site policy, network policy and/or other polices may be applied to the recommended preventive actions to determine whether the execution of the recommended preventive actions on the network devices is harmless to the functionalities of the network as a whole.

One of the purposes of applying various policies to a recommended preventive action is to determine whether the implementation of the particular preventive action would comply with the site policy and thus, whether the execution of the preventive action would be nontoxic to the functionalities of each of the network devices and the network as a whole. For example, even if upgrading an I/O board of the network device may theoretically speed up transmitting data packets via the network device, the upgrading of the I/O board may not be acceptable according to the network policy because the upgraded I/O board may be incompatible with other I/O boards implemented in other network devices in the network. In this example, even though upgrading the I/O board seems as a possible, recommended preventive action, by applying the site policy to the action, the system may determine that upgrading of the I/O board on the particular network device could cause a board incompatibility problem in the network. Therefore, the board upgrading may not be acceptable to perform; its performance may cause serious communications problem within the network.

If it is determined that executing a recommended preventive action is harmless to the functionalities of the network, then the system proceeds to performing the operation at block 280. Otherwise, the system proceeds to block 270.

At block 270, upon determining one or more recommended preventive actions for execution on a network device, a notification about the one or more preventive actions may be provided to a network engineer (network administrator). The notification may include a description of the one or more recommended preventive action and other considerations, including recommendations to seek a management approval to perform the one or more actions.

In response to receiving a notification about preventive actions, a network engineer may determine one or more particular recommended preventive actions for implementing on the network devices, and initiate execution of the selected preventive actions.

In an embodiment, in response to obtaining approval to perform a particular recommended preventive action, the system may cause an execution of the particular preventive action on a network device, on a group of network devices, and/or on a network as a whole.

In an embodiment, after execution of one or more recommended preventing actions was completed, the system may update a device profile associated with a network device, update one or more data metrics associated with the network device, and/or obtain a new set of occurrence data for the network device.

In an embodiment, once execution of preventive actions is completed, a determination is made whether the execution of the particular preventive action indeed prevented occurrence of a particular future event. For example, if a predicted future event pertained to a failure of the network device due to a consistent increase in data traffic via a network device, and a recommended preventive action comprised upgrading an I/O board on the network device, then, upon upgrading the I/O board on the network device as recommended, the system may check whether the predicted future event (network device failure in the near future) was indeed prevented.

In an embodiment, once execution of one or more preventive actions is completed, a network engineer evaluates whether the execution indeed prevented occurrence of one or more predicted undesirable events. For example, if execution of one of the preventing actions recommended for averting a bandwidth shortage was completed, then the network engineer may evaluate whether the bandwidth shortage is indeed going to be avoided next week. If the network engineer determines that bandwidth shortage will persist in the near future, then, the network engineer may select and execute another recommended preventive action, and/or may request new suggestions for one or more preventive actions which, when executed, may prevent occurrence of the bandwidth shortage in the near future.

At block 280, it is determined that a particular recommended preventive action is not acceptable to perform on a network device. For example, upgrading a current class of service for a particular application to another class of service may not be acceptable if a network already experiences a great deal of business-related critical traffic, and upgrading the class of service for the application would negatively impact the traffic.

A particular action may be unacceptable if it may be determined that execution of the particular action may have a negative impact on overall data communications in the network, may cause loss of hardware/software compatibility in the network, may be impractical to perform, or for any reason, may be ineffective in averting one or more undesirable future events.

In response to determining that execution of a particular recommended preventive action may have a negative impact on functionalities of a network as a whole, the system may determine another set of preventive actions as that are potentially capable of preventing one or more undesirable future events. For example, there might be another particular preventive action which, once executed on other network devices, could prevent a failure of the network device.

Upon determining another set of the preventive actions for one or more undesirable future events, the system proceeds to block 250, described above.

In an embodiment, execution of each of the above steps may be depicted in a graphical user interface. A graphical user interface is provided for displaying one or more performance views of various characteristics of the network components. The performance views may be customizable, concise, and composite, and arranged in any manner designed by a user, a software developer or a network administrator.

In an embodiment, performance views may be used to graphically depict operational status, resource availability and connectivity information of the network components. The performance views may also contain displays of one or more predicted events to occur in the future and one or more preventive actions that the system recommends for execution to prevent occurrence of the preventive actions.

In an embodiment, performance views are generated based on performance measurements collected for the network components over time and based on profiles and characteristics of devices in a network. Performance measurements may include historical data archived in data storage and current performance data collected periodically or upon request.

In an embodiment, performance views are used to depict one or more current trends and predicted trends for various characteristics of the network components. Information about current trends for one or more network components may be used to determine one or more predicted trends for the components. The predicted trends may be viewed as abstract performance data because they capture hypothetical characteristics of the network components that the network component may, but do not have to, assume in the future time.

In an embodiment, the approach depicted in FIG. 2 introduces a concept of a new category of proactive trending notifications based on identifying trending events. The proactive trending notifications are distinguishable from the conventional notification categories, such as notifications about events that are critical, notification comprising warnings, and notification comprising various types of current status and configuration information.

In an embodiment, proactive trending notifications provide forecast of potential, future events which, when occur in the future time, may affect one or more functionalities and tasks performed by network devices in a network.

In an embodiment, proactive trending notifications may be displayed in various panels of a graphical user interface, as described above. The display of the proactive trending notifications may be referred to as a dashboard.

In an embodiment, a dashboard comprises a plurality of panels featuring various events, trends, characteristics and actions. A dashboard provides a network engineer with a comprehensive view of the predicted, future events, and provides instantaneous indications about one or more strategies that the network engineer may further explore by following menus and links available on the dashboard.

In an embodiment, a dashboard provides one or more customizable performance views that can be explored and expanded (drilled down) to isolate individual aspects of the potential and future problems, which may occur in a network in the future time.

In an embodiment, the approach encompasses a concept of abstracted performance data. Abstracted performance data allow a network engineer to select the key performance information from an abundance of information, which may be available to the network engineer.

In an embodiment, selection of the abstracted performance data is focused on what is happening in a network, as opposed to the how a particular problem in the network has occurred. Therefore, the approach based on selection of the abstracted performance data may significantly simplify the network management tasks. For example, if a user is concerned about a particular WAN link and requested a throughput metric of the particular WAN link, then, according to the approach depicted in FIG. 2, the system will automatically determine interdependencies between various technologies and protocols implemented for utilizing the particular WAN link, and will generate the abstracted performance data. For instance, the system will collect and monitor data specific to various technologies, such as SNMP MIB, Packet, Netflow, Medianet etc., and provide comprehensive analysis of what is happening in the particular WAN link.

In an embodiment, the approach allows deriving and displaying one or more service assurance templates in addition to generating and displaying one or more profile baselines for the components of the network. By deriving the service assurance templates, presentation of the configuration information and performance visibility data may be significantly simplified. For example, upon determining that one or more vendor-specific-services, such as Cisco provisioning for TP, WAAS and VOIP services, the system may automatically derive the best practice visibility configuration that is suitable for handling the specific services. Therefore, the system may display a dashboard, as described above, and a specific template overlaid on a top of one or more baseline display panels of the dashboard. By having access to the baseline display panels and the specific templates, a network administrator may explore various characteristics of the vendor-specific-services. One example of such templates may include a monitoring template, which includes a set of various data metrics, summarizing data pertaining to various services. Another example of such templates may include a troubleshooting template, which includes not only a set of various data metrics, but also a set of combined metrics. A user may select any of the available metrics to further explore the vendor-provided services and strategy for the network troubleshooting.

4.0 Trends

FIG. 3A illustrates an example of an absolute-value-change trend; FIG. 3B illustrates an example of a relative-change trend; FIG. 3C illustrates an example of a trending-values trend.

In an embodiment, measurement data may be graphically represented as a function plotted in a Cartesian graph. For example, measurement data for a bandwidth usage for a network device may be represented as a collection of data points graphically depicted in a Cartesian graph. Examples of such graphs are depicted in FIGS. 3A-3C. Other graphs, such as three, four, etc., dimensional graphs may also be used.

In an embodiment, one or more graphs may be used to determine current trends and to predict future trends specific to characteristics of network devices.

In FIGS. 3A-3C, measurement data 310 has been plotted into a two-dimensional Cartesian graph, having a horizontal time axis 350 and a vertical value axis 320. The measurement data 310 is depicted as a set of individual data points connected by a spline (a non-linear curve of a high degree).

As depicted in FIGS. 3A-3C, at time t1 304, the measurement data 310 has value v1 325. At time t2 340, the measurement data 310 has value v2 330.

FIG. 3A illustrates an embodiment of an absolute-value-change trend. In an embodiment, an absolute value change for the measurement data 310, defined within the time interval [(time 340), (time 304)], may be expressed as:

Absolute value of v2−v1.

In an embodiment, an absolute-value change represents an absolute value of the measurement data values within a particular time interval. For example, if the value 330 is 10, and the value 325 is 5, then the absolute-value-change is |10−5|=5, which indicates that the magnitude of the measurement data was changed (increased) by 5 by the end of the time interval [time 304, time 340].

In an embodiment, by analyzing a set of absolute value changes for measurement data 310, defined within a set of particular time intervals, the system may determine whether the value change is consistent within the set of the particular time intervals. For example, the system may determine whether the measurement data 310 has a tendency to rise or to fall.

In an embodiment depicted in FIG. 3A, the overall tendency of the measurement data is to rise. Stating differently, with an increase of time, the value of the respective measurement data is increasing. Hence, the system may determine that the current trend for the particular measurement data is consistently increasing.

In an embodiment, based on a current trend depicted in FIG. 3A and additional information, such as site profiles, device profiles and policies, a system may determine a future trend. For example, assuming that the current increasing trend for particular measurement data will continue in the future, the system may determine that the future trend for the particular measurement data will also increase.

In an embodiment, a future trend may be used to determine whether the trend may cause an undesirable future event. For example, if the future trend for bandwidth consumption continues to be on a rise, then it is possible that there might be bandwidth deficit in the near future. For instance, if an absolute value change for a predetermined time interval in the future trend exceeds a threshold value of 10, then the system may determine bandwidth problems to occur in the future, and may recommend one or more preventive actions which, when executed, may prevent the occurrence of the bandwidth problems.

FIG. 3B illustrates an embodiment of a relative-change trend. In an embodiment, a relative-change value for the measurement data 310, defined within the time interval [(time 340), (time 304)] may be simply expressed as:

$$((\text{value } 330)-(\text{value } 325))/(\text{value } 330-0.).$$

Alternatively, a relative-change value can be defined using a percentile multiplier or a Gaussian number of standard deviation.

In an embodiment, a relative-change value indicates a ratio in which the measurement data value was increased as sampled at the end of a particular time interval over the measurement data value as sampled at the beginning of the particular time interval. For example, if the value 330 is 10, and the value 325 is 5, then a relative-change value is (10−5)/(5−0.)=1, which indicates that the magnitude of the measurement data has doubled by the end of the time interval [time 304, time 340].

In an embodiment, by analyzing a set of relative change values for measurement data 310, defined within a set of particular time intervals, the system may determine whether the value change is consistent within the set of the particular time intervals. For example, the system may determine whether the measurement data 310 has a tendency to rise or to fall. Furthermore, just as in FIG. 3A, assuming that the current increasing trend for particular measurement data will continue in the future, the system may determine that a future trend for a particular measurement data will also increase, and determine whether the trend may lead to an undesirable future event.

FIG. 3C illustrates an embodiment of a trending-values trend. In an embodiment, a trending-values for the measurement data 310, defined within the time interval [(time 340), (time 304)] may be expressed as:

$$((\text{value } 330)-(\text{value } 325))/(\text{time } 340-\text{time } 304).$$

Other statistical methods, such as linear regression methods, could be implemented to determine trending-values. Such methods can define a function that takes into account one or more frequency types, such as an hour of a day, a day of a week, a day of a month, or a date in a year.

In an embodiment, a trending-values ratio indicates a slope characteristic for the overall measurement data, determined for a particular time interval. For example, if the value 330 is 10, the value 325 is 5, time 340 and 20 and time 304 is 10, then the trending-values ratio is (10−5)/(20−10)=5/10=½, which indicates an uphill slope of the trending line 318.

In an embodiment, by analyzing the slope of the trending-values for measurement data 310, defined within a set of particular time intervals, the system may determine whether the value change is consistent within the set of the particular time intervals. For example, the system may determine whether the measurement data 310 has a tendency to rise or to fall. Furthermore, just as in FIG. 3A-3B, assuming that the current increasing trend for particular measurement data will continue in the future, the system may determine that a future trend for a particular measurement data will also increase, and determine whether the trend may lead to an undesirable future event.

5.0 Graphical User Interface Example

Figure 4:
FIG. 4 illustrates a use of one embodiment of determining a preventive action for a network device.

FIG. 4 illustrates a use case of one embodiment of determining a preventive action for a network device. In an embodiment, a graphical user interface (GUI) 400 comprises several panels for displaying various types of information. Throughout the specification, GUI 400 may also be referred to as a dashboard.

In an embodiment, GUI 400 comprises a Header panel 402 that includes hot links to various options, services, infrastructure elements, endpoints, users, etc., and pull-down menus for performance options, identity options, dashboard applications, configuration options, troubleshooting options, services options, administrative options, and other options, not necessarily depicted in FIG. 4, but available to a network administrator.

In an embodiment, GUI 400 may also comprise a Site Services Health panel 404 for displaying information related to various software applications, such as a Cisco Voice application, a Cisco TelePresence application, a Web-Browsing application and other applications executed by devices in the network. Cisco TelePresence, first introduced in October 2006, is a product developed by Cisco Systems, and provides high-definition 1080p video, spatial audio, and a setup designed to link two physically separated rooms so that they resemble a single conference room.

In an embodiment, a Site Services Health panel 404 displays various services offered by various regions, and alarms and alerts if such have been generated for a particular service. An algorithm for generating an alert may take into consideration a consistent increase of data values stored in a particular metrics over a period of time. For example, an alert may be generated for critical business applications in situations when combined data traffic transmitted over the same links as data exchanged by the business applications, negatively impacts performance of the critical business applications. For instance, if an average response time is expected to be bounded between a minimum value and maximum value relative to baseline (e.g., 30 percentile additional increase up to 150 percentile), and the predicted average response time is expected to exceed the maximum threshold, then an alert may be generated.

In an embodiment, GUI 400 may also comprise a Top Site Traffic panel 428 for displaying data centers, hubs and other communications nodes that experience a relatively heavy traffic and for displaying active communications sessions established with the devices in the network.

In an embodiment, GUI 400 may also comprise a Top Network Applications panel 416 for displaying a set of applications that are executed by nodes of a particular center at a particular moment.

In an embodiment, GUI 400 may also comprise a Top Host Traffic panel 419 for displaying a set of hosts that experience a relatively heavy traffic. The hosts may be identified by their Internet Protocol (IP) addresses; although other forms of host identification are also permitted.

In an embodiment, as depicted in Site Services Health panel 414, the system determined that a web browsing services provided in the Phoenix region experience some problems and that one or more notifications are available to remedy the problem. Once a network administrator or a network engineer notices the problem and the notification, the network engineer may want to further explore the situation and request additional information pertaining to the problem and the notification. A few examples of the steps that the network engineer may perform to further interrogate the predicted events and notifications are described in reference to FIG. 5-7.

Figure 5:
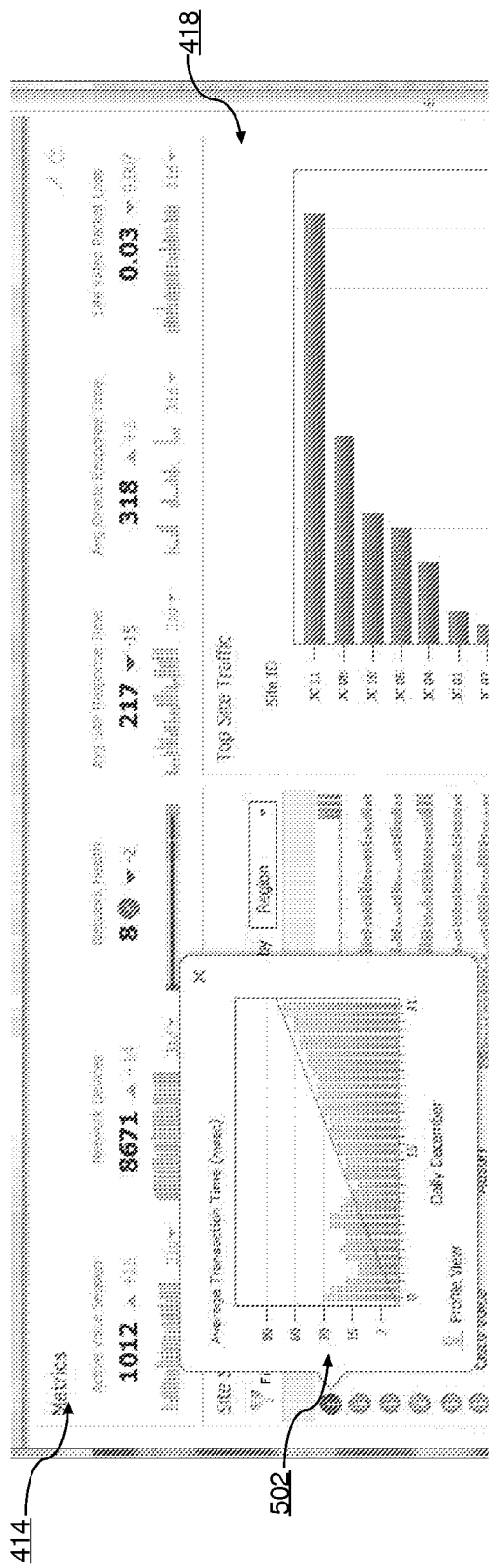
FIG. 5 illustrates a use of one embodiment of determining a preventive action for a network device.

FIG. 5 illustrates a use case of one embodiment of determining a preventive action for a network device. In an embodiment, a network administrator noticed a display in a dashboard that indicated some problems with web browsing services provided in Phoenix' region and that one or more predictive notifications are available to remedy the problems. The network administrator wanted to collect more information about the problems, and, upon selecting the problem indicator, launched a panel for displaying an average transaction time 502.

In an embodiment, a panel for displaying an average transaction time 502 illustrates that as the time progresses, the corresponding average transaction time for data packets communicated within the Phoenix region has been gradually increasing. This corresponds to a current trend determined based on collected measurement data and described in FIG. 2 above.

In an embodiment, a network administrator may request a display of future trends for the average transaction time. The display of the future trends for the average transaction time may be generated based on the current trend determined from the already collected average transaction time measurement data, and based on various profiles associated with the Phoenix region. For example, as described in reference to FIG. 2, a future trend may be determined using information about the current trend and a site profile, a device profile, polices and other information about a particular device or site.

In an embodiment, a network administrator may also request a display of a site profile, a device profile, or any other profile associated with components present and communicating within the Phoenix region.

Figure 6:
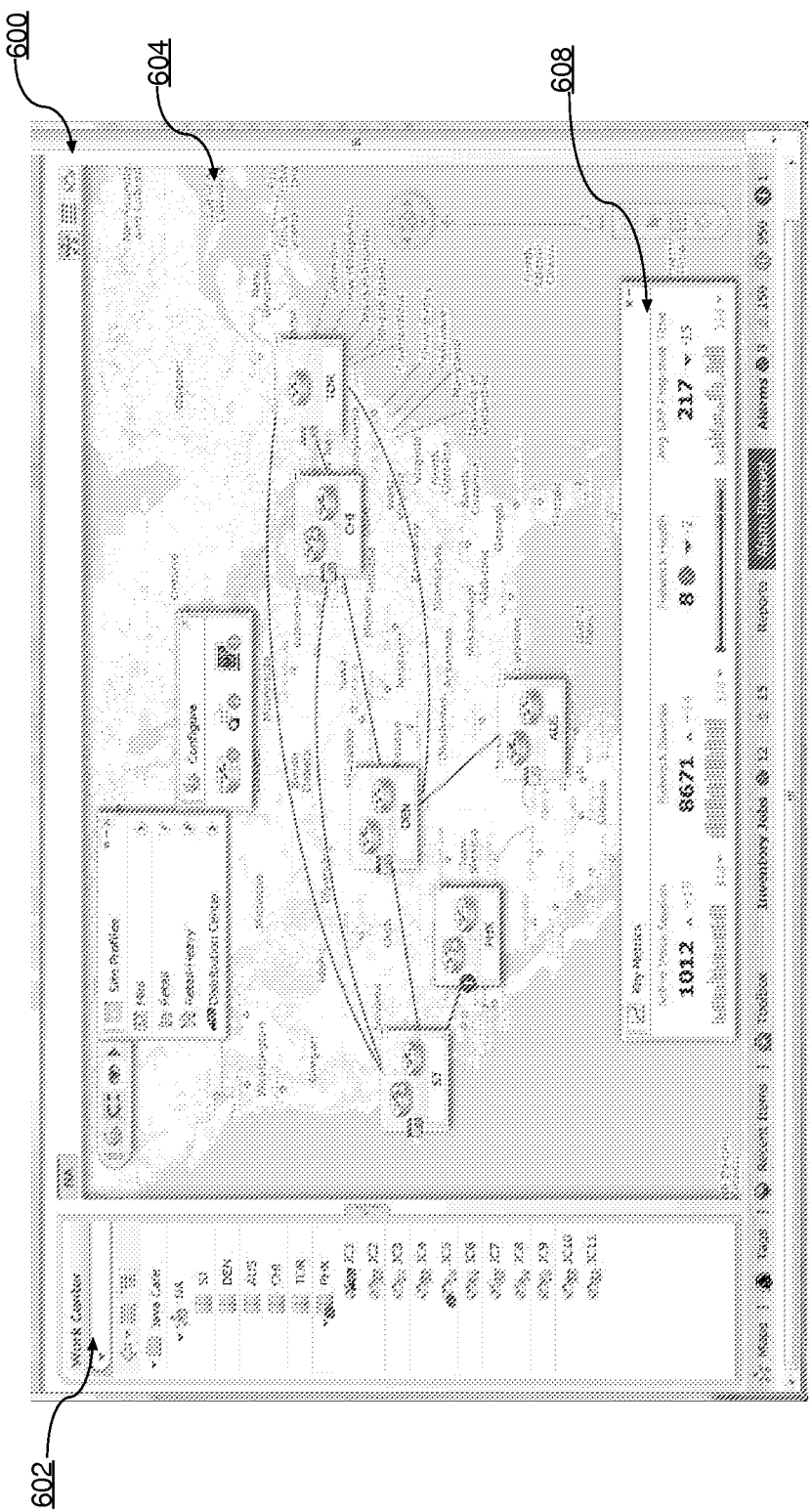
FIG. 6 illustrates a use of one embodiment of determining a preventive action for a network device.

FIG. 6 illustrates a use case of one embodiment of determining a preventive action for a network device. In an embodiment, FIG. 6 depicts a GUI panel 600, comprising a work center panel 602, a map panel 604 and a key metric panel 608.

In an embodiment, a network administrator may launch a GUI panel 600 to obtain and review additional information related to problems indicated by the system for a particular site. For example, upon receiving an indication about problems occurring in the Phoenix region, a network administrator might want to identify the centers that communicate with the Phoenix region at the particular moment, and determine ports and communications connections that may potentially cause some problems.

In an embodiment, a network administrator may review a map panel 604 that depicts a network of communications centers. The network may include the Phoenix region that has been determined as experiencing some problems. By reviewing the map panel 604, the network administrator may determine that a communications center in the Phoenix region is communicating with San Jose center, which in turn communicates with Denver center, Chicago center, and Austin center. By further inspecting the map panel 604, the network administrator may also determine that a web-browsing service problem occurs along a communications link between the Phoenix region and San Jose center, or at a communication port of the Phoenix region host communicating with San Jose center. Subsequently, the network administrator may want to request additional information, including key metrics for communications session established between the Phoenix region and San Jose center.

In an embodiment, key metrics may be divided into two groups. A first group may include metrics that are defined independently from other metrics and that comprise data collected independently from collections of other type of data. Examples of such metrics may include metric generated to collect information about a quantity of applications executed simultaneously on a particular node, by a particular site, or by a particular user.

A second group of metrics may include metrics that are codependent with one or more other metrics. For example, a metric that indicates types of the applications that trigger a particular trend of bandwidth consumption by a particular network device may be viewed as a metric that co-depends on a metric that is generated to determine the particular trend and the metric that is generated to determine the applications executed on the particular network device.

In an embodiment, a network administrator may review a key metric panel 608 that depicts various metrics for a selected communications link. For example, in an embodiment depicted in FIG. 6, the key metric panel 608 depicts various metrics, including an active voice session metric providing characteristics for a voice session established on a selected communications link, a network devices metric for the devices communicating along the selected communications link, a network health metric for the overall health status of the selected communications link, and an average SAP response time metric having values specific to the selected communications link. By exploring the information depicted in various panels, the network administrator may gather detailed information about the problems flagged by the system and about recommended preventive actions suggested by the system.

Figure 7:
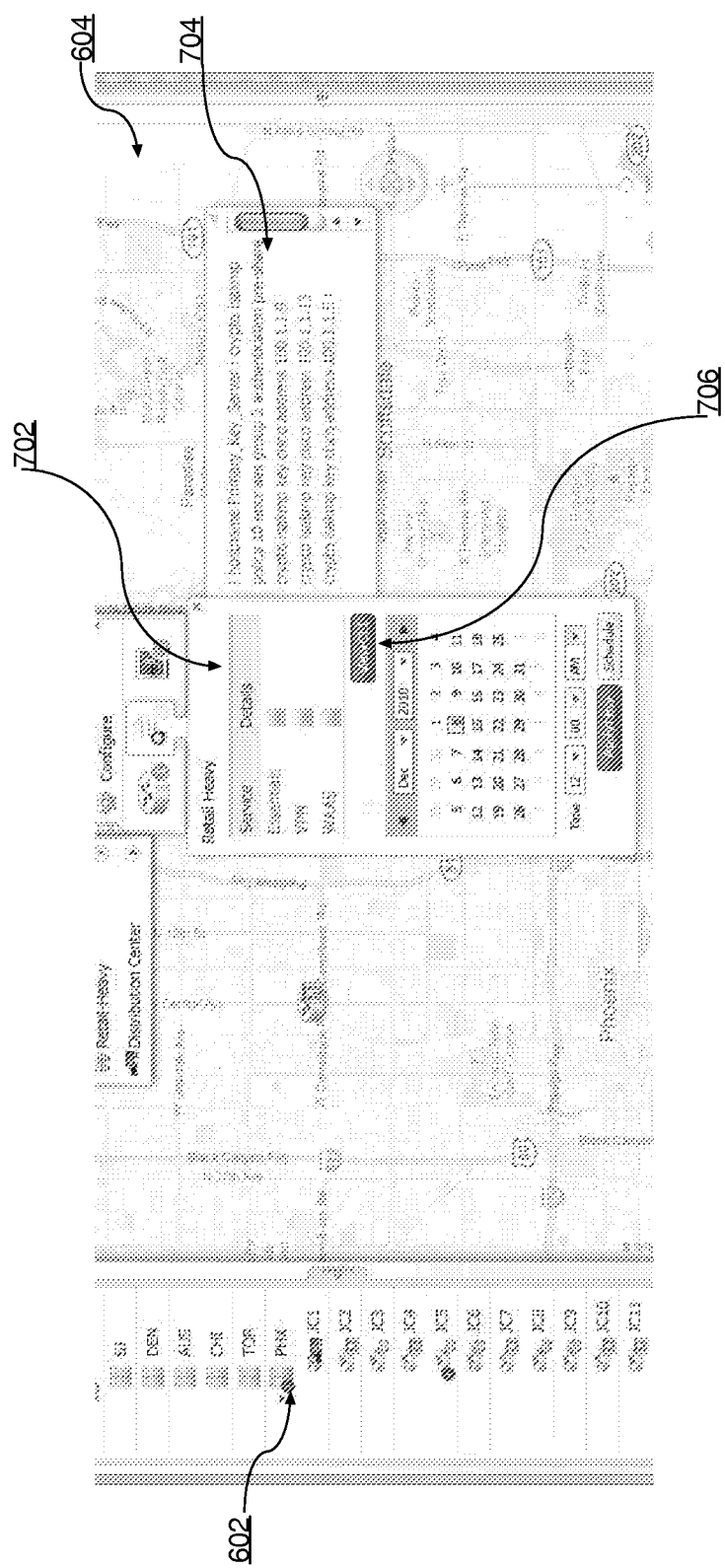
FIG. 7 illustrates a use of one embodiment of determining a preventive action for a network device.

FIG. 7 illustrates a use case of one embodiment of determining a preventive action for a network device. In an embodiment, a network administrator may request additional information about a site profile, for which one or more problems have been identified. For example, the network administrator may want to review a site profile for the region that is experiencing problems. Further, the network administrator may want to determine the type of the site profile, and characteristics of the site profile. Moreover, the network administrator may want to review a site policy, a network device policy and other policies available for site for which some problems have been identified by the system.

In an embodiment, a network administrator launches a display of a site profile for which one or more problems have been identified. For example, if the system indicated some problems with the Phoenix region, as depicted in FIG. 7, element 602, then the network administrator may launch a display of a site profile for the Phoenix region. The display may be overlaid over a map display 604, described above.

In an embodiment, a site profile may comprise one or more display panels containing detailed characteristics of the site. For example, a site profile may contain a site profile type panel 702, a host specification panel 704 and any additional panels and widgets, such as for example a view CLI panel 706.

In an embodiment, as depicted in a site profile type panel 702, a site profile associated with the Phoenix region host is a retail heavy. Depending on the implementation, that may indicate that the Phoenix region host is servicing a network of retailers, and provides some advanced services, including a VPN service, a WAAS service and others.

In an embodiment, as depicted in a host specification panel 704, a Phoenix region host has an associated hostname Primary_Key_Server. The host uses cryptography protocol ISAKMP policy 10 encryption group 2 with an authentication pre-share, and various crypto isakmp keys for specific nodes.

In an embodiment, screen shots depicted in FIG. 4-6 are just examples of many GUI displays available via a dashboard described above.

In the example described in FIGS. 4-7, a network engineer may decide to change a site policy to one that is better suited for servicing high data traffic. For instance, the network administrator may consider activating a WAN optimization, which may require an additional cost to the customers.

To determine that activating a WAN optimization is a valid recommended preventive action, a network administrator may want to determine whether a WAAS capability is indeed part of the policy for the Phoenix region. The network administrator may make that determination by inspecting content of a retail-heavy panel 702 displayed in FIG. 7. As depicted in FIG. 7, the WAAS capability is listed in the panel 702. Hence a WAN optimization may be activated for a Phoenix region host. The network administrator may take a look at the script prior to a policy change implementation, and decide to deploy a profile modification in a maintenance window (not depicted in FIG. 7)

By using the dashboard and the approach described above, a network administrator saved time by leveraging proactive alarms in selecting a proper preventive action. The approach described above and intelligence stored in profiles and templates may significantly simplify site-management procedures.

6.0 Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 8:
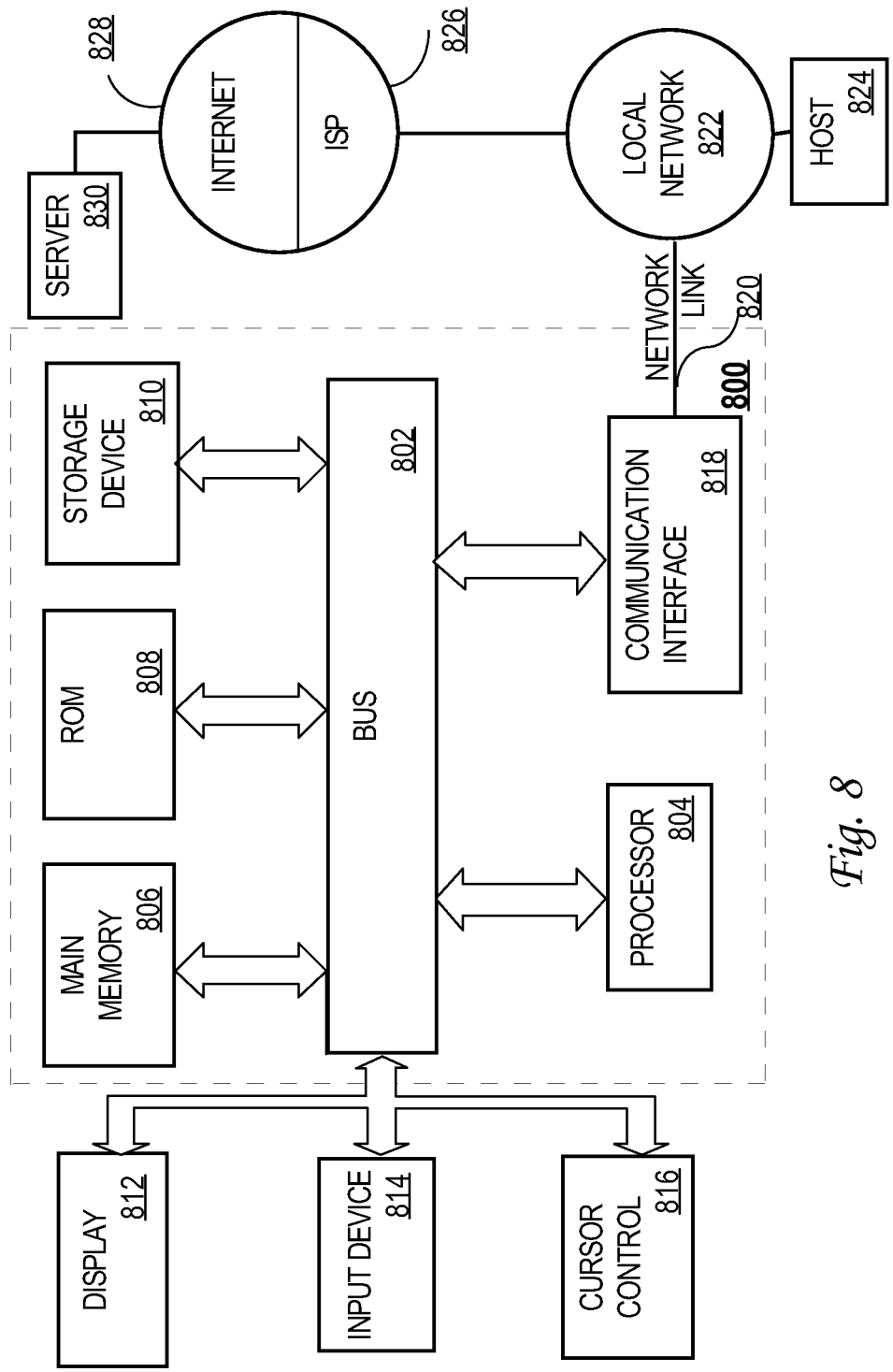
FIG. 8 illustrates an example computer system with which an embodiment may be implemented.

For example, FIG. 8 is a block diagram that illustrates a computer system 800 upon which an embodiment of the invention may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term storage media as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 810. Volatile media includes dynamic memory, such as main memory 806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the Internet 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

7.0 Extensions and Alternatives

In the foregoing specification, embodiments of the invention have been described with reference to numerous specific details that may vary from implementation to implementation. The specification and drawings are, accordingly, to be regarded in an illustrative rather than a restrictive sense.

What is claimed is:

1. A computer implemented data processing method, comprising:
    monitoring occurrence data, the occurrence data representing one or more performance measurements collected for a network device in a network comprising a plurality of devices, and being associated with one or more data metrics;
    determining one or more current trends that are reflected in the occurrence data;
    determining one or more predicted trends for the network device;
    determining, based on the predicted trends, one or more future events that are predicted to occur at the network device at a future time; and
    determining, by applying a site policy to the one or more future events, one or more preventive actions for the network device to prevent occurrence of the one or more of the future events;
    wherein the applying a site policy comprises determining whether execution of a preventive action, from the one or more preventive actions, is nontoxic to functionalities of each device in the network and the network as a whole.

2. The method of claim 1, further comprising:
    causing execution of a particular preventive action at the network device in response to obtaining approval to perform the particular preventive action from the one or more preventive actions;
    determining whether the execution of the particular preventive action prevents occurrence of the particular future event;
    updating a device profile associated with the network device based on the occurrence data; and
    based on the occurrence data, updating the one or more data metrics.

3. The method of claim 2, wherein the device profile comprises:
    the site policy;
    a function description of one or more functions that the network device is configured to perform;
    a role description of one or more roles that the network device is configured to perform;
    a resource description of a storage capacity and a processing capacity of the network device;
    a configuration description of configuration parameters and settings for the network device; and
    one or more data histograms generated from the occurrence data obtained for the network device.

4. The method of claim 2, further comprising:
    displaying, on a display device, a graphical user interface that depicts the one or more data histograms in one or more display panels;
    in response to receiving first user input selecting a first indicator from a first display panel, determining a first request for displaying a first data histogram, and displaying the first data histogram in a histogram panel;
    in response to receiving second user input selecting a second indicator from a second display panel, determining a second request for displaying the one or more current trends, the one or more predicted trends, and the one or more preventive actions, displaying the one or more current trends, the one or more predicted trends in trend panels, and displaying the one or more preventive actions in an action panel; and
    in response to receiving third user input selecting a third indicator from the action panel, requesting activation of the particular preventing action from the one or more preventive actions displayed in the action panel.

5. The method of claim 1, wherein the monitoring the occurrence data comprises at least one of:
    monitoring service levels for applications executed on the network device;
    monitoring infrastructure of the network device to ensure delivery of communications to and from the network device;
    monitoring capacity issues of the network device;
    monitoring usage of the network device;
    monitoring changes in traffic patterns;
    monitoring configuration issues; and
    monitoring violations of a service level objective.

6. The method of claim 1, wherein the site policy comprises:
    one or more rules to determine deviations from a service level agreement (SLA) for the network device;
    rules to determine whether the one or more current trends exceed one or more threshold values;
    rules to determine whether an absolute value in a first trend from the one or more trends exceeds a first threshold value;
    rules to determine whether a relative trend change in a second trend from the one or more trends exceeds a second threshold value; and
    rules to determine whether trend values in a third trend from the one or more trends are consistent with historical data.

7. The method of claim 1, wherein the one or more preventive actions to be executed on the network device comprise at least one of:
    modifying the device profile to collect additional performance data;
    activating one or more additional data metrics to store the additional performance data for the network device;
    obtaining additional information about a status of the network device;
    monitoring the one or more additional data metrics to determine any potential problems in carrying on functions of the network device;
    opening a service call to service the network device;
    opening a device reconfiguration request to reconfigure the network device;
    generating an alarm to indicate a specific problem with the network device;
    issuing a notification to indicate the specific problem with the network device;
    indicating one or more applications that should not be executed on the network device; and
    indicating one or more components of the network device that require servicing.

8. An internetworking device, comprising:
    one or more processors;
    a monitoring unit coupled to the one or more processors and configured to obtain occurrence data representing one or more performance measurements collected for a network device and associated with one or more data metrics, and to monitor the occurrence data;
    a trend unit configured to determine one or more current trends reflected in the one or more data histograms;

a prediction unit configured to determine one or more predicted trends for the network device, and to determine, based on the predicted trends, one or more future events that are predicted to occur at the network device at a future time; and a preventive action unit configured to determine, by applying a site policy to the one or more future events, one or more preventive actions for the network device to prevent occurrence of the one or more of the future events;

wherein the applying a site policy comprises determining whether execution of a preventive action, from the one or more preventive actions, is nontoxic to functionalities of each device in the network and the network as a whole.

9. The apparatus of claim 8, wherein the prediction unit is further configured to perform operations comprising:

in response to obtaining approval to perform a particular preventive action from the one or more preventive actions, executing the particular preventive action at the network device;

determining whether the execution of the particular preventive action prevents occurrence of the particular future event;

updating a device profile associated with the network device based on the occurrence data; and based on the occurrence data, updating the one or more data metrics.

10. The apparatus of claim 9, wherein the device profile comprises:

the site policy;

a function description of one or more functions that the network device is configured to perform;

a role description of one or more roles that the network device is configured to perform;

a resource description of a storage capacity and a processing capacity of the network device;

a configuration description of configuration parameters and settings for the network device; and one or more data histograms generated from the occurrence data obtained for the network device.

11. The apparatus of claim 9, further comprising a user interface unit configured to perform operations comprising:

displaying a graphical user interface that depicts the one or more data histograms in one or more display panels;

in response to receiving a first user input selecting a first indicator from a first display panel, determining a first request for displaying a first data histogram, and displaying the first data histogram in a histogram panel;

in response to receiving second user input selecting a second indicator from a second display panel, determining a second request for displaying the one or more current trends, the one or more predicted trends, and the one or more preventive actions, displaying the one or more current trends, the one or more predicted trends in trend panels, and displaying the one or more preventive actions in an action panel; and in response to receiving third user input selecting a third indicator from the action panel, requesting activation of the particular preventing action from the one or more preventive actions displayed in the action panel.

12. The apparatus of claim 8, wherein the monitoring unit monitors the occurrence data in operations comprising at least one of:

monitoring service levels for applications executed on the network device;

monitoring infrastructure of the network device to ensure delivery of communications to and from the network device;

monitoring capacity issues of the network device;

monitoring usage of the network device;

monitoring changes in traffic patterns;

monitoring configuration issues; and monitoring violations of a service level objective.

13. The apparatus of claim 8, wherein the site policy comprises:

one or more rules to determine deviations from a service level agreement (SLA) for the network device;

rules to determine whether the one or more current trends exceed one or more threshold values;

rules to determine whether an absolute value in a first trend from the one or more trends exceeds a first threshold value;

rules to determine whether a relative trend change in a second trend from the one or more trends exceeds a second threshold value; and rules to determine whether trend values in a third trend from the one or more trends are consistent with historical data.

14. The apparatus of claim 8, wherein the one or more preventive actions to be executed on the network device comprise at least one of:

modifying the device profile to collect additional performance data;

activating one or more additional data metrics to store the additional performance data for the network device;

obtaining additional information about a status of the network device;

monitoring the one or more additional data metrics to determine any potential problems in carrying on functions of the network device;

opening a service call to service the network device;

opening a device reconfiguration request to reconfigure the network device;

generating an alarm to indicate a specific problem with the network device;

issuing a notification to indicate the specific problem with the network device;

indicating one or more applications that should not be executed on the network device; and indicating one or more components of the network device that require servicing.

15. A non-transitory computer-readable storage medium storing one or more sequences of instructions which, when executed by one or more processors, cause the one or more processors to perform operations comprising:

obtaining occurrence data representing one or more performance measurements collected for a network device and associated with one or more data metrics;

monitoring the occurrence data;

determining one or more current trends that are reflected in the occurrence data;

determining one or more predicted trends for the network device;

determining, based on the predicted trends, one or more future events that are predicted to occur at the network device at a future time; and determining, by applying a site policy to the one or more future events, one or more preventive actions for the network device to prevent occurrence of the one or more of the future events;

wherein the operations that cause applying a site policy comprise additional operations that cause determining whether execution of a preventive action, from the one or more preventive actions, is nontoxic to functionalities of each device in the network and the network as a whole.

16. The non-transitory computer-readable storage medium of claim 15, further storing instructions which, when executed, cause the one or more processors to perform operations comprising:
- executing a particular preventive action at the network device in response to obtaining approval to perform the particular preventive action from the one or more preventive actions;
- determining whether the execution of the particular preventive action prevents occurrence of the particular future event;
- updating a device profile associated with the network device based on the occurrence data; and
- based on the occurrence data, updating the one or more data metrics.

17. The non-transitory computer-readable storage medium of claim 16, wherein the device profile comprises at least one of:
- the site policy;
- a function description of one or more functions that the network device is configured to perform;
- a role description of one or more roles that the network device is configured to perform;
- a resource description of a storage capacity and a processing capacity of the network device;
- a configuration description of configuration parameters and settings for the network device; and
- one or more data histograms generated from the occurrence data obtained for the network device.

18. The non-transitory computer-readable storage medium of claim 15, wherein monitoring the occurrence data comprises at least one of:
- monitoring service levels for applications executed on the network device;
- monitoring infrastructure of the network device to ensure delivery of communications to and from the network device;
- monitoring capacity issues of the network device;
- monitoring usage of the network device;
- monitoring changes in traffic patterns;
- monitoring configuration issues; and
- monitoring violations of a service level objective.

19. The non-transitory computer-readable storage medium of claim 15, wherein the site policy comprises at least one of:
- rules to determine deviations from a service level agreement (SLA) for the network device;
- rules to determine whether the one or more current trends exceed one or more threshold values;
- rules to determine whether an absolute value in a first trend from the one or more trends exceeds a first threshold value;
- rules to determine whether a relative trend change in a second trend from the one or more trends exceeds a second threshold value; and
- rules to determine whether trend values in a third trend from the one or more trends are consistent with historical data.

20. The non-transitory computer-readable storage medium of claim 15, further storing instructions which, when executed, cause the one or more processors to perform operations comprising:
- displaying a graphical user interface that depicts the one or more data histograms in one or more display panels;
- receiving a first request for network management information, the first request identifying at least one of a user, a user device, or a user application; and
- in response to the first request, displaying network management information on a graphical user interface (GUI) at the user interface device, the network management information including a first data histogram in a histogram panel.

21. The non-transitory computer-readable storage medium of claim 20, further storing instructions which, when executed, cause the one or more processors to perform operations comprising:
- receiving a second request for the network management information, the second request identifying at least one of the user, the user device, or the user application; and
- in response to the second request, displaying the network management information on the GUI at the user interface device, the network management information including one or more of: the one or more current trends, the one or more predicted trends, and the one or more preventive actions.

* * * * *